(12) United States Patent
Cleenewerck

(10) Patent No.: US 8,304,010 B2
(45) Date of Patent: Nov. 6, 2012

(54) STRUCTURED FOOD PRODUCTS WITH LOW CONTENT OF SATURATED AND TRANS UNSATURATED FATS

(75) Inventor: Bernard Cleenewerck, Knokke-Heist (BE)

(73) Assignee: Fuji Oil Company, Limited, Osaka (JP)

( * ) Notice: Subject to any disclaimer, the term of this patent is extended or adjusted under 35 U.S.C. 154(b) by 237 days.

(21) Appl. No.: 12/599,832

(22) PCT Filed: May 15, 2008

(86) PCT No.: PCT/EP2008/055981
§ 371 (c)(1),
(2), (4) Date: Dec. 9, 2009

(87) PCT Pub. No.: WO2008/138970
PCT Pub. Date: Nov. 20, 2008

(65) Prior Publication Data
US 2010/0196544 A1 Aug. 5, 2010

(30) Foreign Application Priority Data

May 15, 2007 (EP) .................................... 07108287
Aug. 8, 2007 (EP) .................................... 07114024

(51) Int. Cl.
*A23D 9/00* (2006.01)
(52) U.S. Cl. ....................................... 426/607; 426/601
(58) Field of Classification Search .................. 426/606, 426/607
See application file for complete search history.

(56) References Cited

U.S. PATENT DOCUMENTS

| | | | |
|---|---|---|---|
| 4,199,611 A | 4/1980 | Toyoshima et al. | |
| 4,594,259 A * | 6/1986 | Baker et al. ................... | 426/613 |
| 4,595,259 A * | 6/1986 | Perregaux ......................... | 349/3 |
| 4,873,109 A | 10/1989 | Tanaka et al. | |
| 5,069,915 A * | 12/1991 | Devitt et al. .................... | 426/93 |
| 6,777,018 B2 * | 8/2004 | Floeter et al. ................. | 426/603 |
| 7,108,888 B2 * | 9/2006 | Floeter .......................... | 426/603 |
| 7,118,773 B2 * | 10/2006 | Floeter et al. ................. | 426/603 |
| 7,700,146 B2 * | 4/2010 | Cleenewerck ................ | 426/607 |
| 7,947,323 B2 * | 5/2011 | Cleenewerck et al. ....... | 426/607 |
| 2010/0196544 A1 * | 8/2010 | Cleenewerck .................. | 426/74 |

FOREIGN PATENT DOCUMENTS

| | | | |
|---|---|---|---|
| BE | 1736059 | * | 12/2006 |
| EP | 0 023 062 A1 | | 1/1981 |
| EP | 0 285 422 A2 | | 10/1988 |
| EP | 0 424 997 A2 | | 5/1991 |
| EP | 0 687 142 B1 | | 1/1997 |
| EP | 0 719 090 B1 | | 7/1999 |
| EP | 0 731 645 B1 | | 2/2001 |
| EP | 0 739 589 B1 | | 6/2001 |
| EP | 0 875 152 B1 | | 3/2003 |
| EP | 1 543 728 A1 | | 6/2005 |
| FR | 2 435 206 | | 4/1980 |

* cited by examiner

*Primary Examiner* — Carolyn Paden

(74) *Attorney, Agent, or Firm* — Scully, Scott, Murphy & Presser, P.C.

(57) ABSTRACT

The present invention relates to a structured food product with a hard texture, containing between 20 and 100% of a fat phase and between 0 and 15% of water, whereby the fat phase contains at least one fat composition containing—between 10 and 55 wt. % of at least one liquid oil with a saturated fatty acid content of less than 25 wt. % with respect to the weight of the liquid oil between 45 and 90 wt. % of a hard fat component with a StOSt/POP ratio of at least 2, preferably at least 2.5, most preferably at least 3.0, wherein St is stearic acid, P is palmitic acid and O is oleic acid. The present invention also relates to a process for producing such a structured food product.

60 Claims, No Drawings

STRUCTURED FOOD PRODUCTS WITH LOW CONTENT OF SATURATED AND TRANS UNSATURATED FATS

The present invention relates to a structured food product with a hard texture. The present invention also relates to glyceride compositions suitable for use in such a food product and to processes for producing such a structured food product.

BACKGROUND OF THE INVENTION

In a wide variety of food products, fat is used as a major component not only because of its nutritional importance, but also because of its wide range of functional properties. Fat has been found to be an ingredient which may be suitably combined with a wide variety of dry ingredients, often powdery ingredients. In these applications the fat will mostly be added in the liquid state or under shortenised form to a homogeneous mass of the dry ingredients. In other applications fat is combined with water and some dry ingredients. A homogeneous product is obtained when emulsifying the fat with the water.

One of the most important functional properties of the fat is its effect on the structure of the final food product in which it is incorporated. The structure of a product depends on both its recipe—i.e. the amount and nature of the fat and the other ingredients—and on the process according to which the product is made. For example processing steps such as emulsification, heating, tempering, influence the structure of the product obtained.

An example of a food product where the nature of the incorporated fat has a prominent effect on the structure is chocolate. Chocolate has a hard structure because of the incorporation of cocoa butter which is a hard fat; confectionery creams like medium hard sandwich creams contain a medium hard fat; spreads for example chocolate spreads, contain high amounts of liquid oil to obtain the typical soft and spreadable end product. In each of these examples fat is combined with at least one powdery ingredient (for example sugar, milk powder, cocoa powder, etc.).

Depending on the intended application and the final structure envisaged for the application, a fat will be chosen with a specific Solid Fat Content (SFC) as a function of temperature. Typical SFC-profiles for different applications are illustrated in EP-A-739,589 table 22a. The SFC-profile depends mainly on the nature of the fatty acids making up the (tri)glycerides of the fat, on the triglyceride composition, and on the method used to solidify the fat—in particular the crystallisation time and temperature, whether the product has been subjected to tempering or not, etc. Whether a fat at a certain temperature is liquid or solid is determined not only by the chain length of the fatty acids, but in particular by the type of fatty acid, i.e. whether it is saturated or non-saturated, and in case of non-saturated fatty acids, the type of isomer, cis or trans. For products that need a rather firm structure, usually a fat with a rather high SFC-profile will be selected, meaning that the fat will have a quite high amount of saturated fatty acids and/or trans isomers of non-saturated fatty acids. Saturated fatty acids (SAFA) are abundantly present in natural fats like cocoa butter, palm oil, palm kernel oil, coconut oil, tallow, etc. Trans fatty acids (TFA) of natural origin are mainly found in ruminant fats. Natural vegetable oils and fats do not contain this trans isomer. Although TFA are unsaturated fatty acids, their structure and melting profile is much closer to that of the corresponding saturated fatty acid than to that of their cis-form.

Although a wide range of hard structural fats suitable for producing structured products is naturally available, there is still a big need for fats with a solid structure and a major fatty acid chain ranging from C14 to C20. To obtain such fats, hydrogenation of liquid oils like soy, rapeseed, sunflower, groundnut oil to hard fats has been widely used. Hydrogenation, also called "hardening" of the liquid oils and fats, is usually carried out in the presence of a catalyst. However, the hydrogenation not only involves conversion of unsaturated fatty acids into saturated fatty acids, but also conversion of cis-unsaturated fatty acids into trans-isomers. Both the increased amount of SAFA and TFA contribute to the increased hardness after hydrogenation. Although from a functional point of view the use of a fat with a rather high amount of SAFA and/or TFA will be recommended to achieve the desired structure, from a nutritional point it is highly preferred to limit the concentration of these fatty acids. It has been demonstrated that consumption of SAFA and TFA increases the risk to the occurrence of cardiovascular diseases. Therefore official instances, like WHO, have issued maximum recommended levels of daily intake of SAFA and TFA. Studies on the consumption patterns of fats in food, like the so-called Transfair study, conducted in a number of European countries, indicate that the daily intake of both SAFA and TFA is far too high, in a large number of countries.

For certain food products, like chocolate, it is desirable that they show a very hard and snappy structure, and at the same time completely melt at body temperature, without leaving a sensation of waxiness in the mouth. In chocolate, these remarkable characteristics are obtained by the use of cocoa butter. Cocoa butter advantageously is a natural, non-hydrogenated fat. However, it has the disadvantage that it contains about two thirds of saturated fats, which is easily understandable from its typical symmetrical SUS-triglyceride structure (S=Saturated fatty acid; U=Unsaturated fatty acid).

There is thus a need for food systems and food products, with a hard structure comparable to chocolate, wherein the glycerides present in the product contain a limited level of SAFA and/or TFA, whereby the products exhibit the typical properties of chocolate, in particular a good melting in the mouth, snap and sufficient heat resistance. There is also a need for glyceride compositions which enable producing food products with such hard structure, but with a limited level of SAFA and/or TFA, and to a process for producing such compositions.

DESCRIPTION OF THE PRIOR ART

From EP-A-719,090 healthy fats are known with a saturated fatty acid content less than 35 wt. %, for use in spreads or margarine. The fats further contain 5-45 wt. % S2U, 0-60 wt. % SU2, 5-95 wt. % U3 and 0-8 wt. % S3. The diglyceride content is less than 5 wt. % as it is believed that the presence of diglycerides in margarine fats has a negative impact on the crystallization behavior. The fats disclosed in EP-A-719,090 are characterized by a flat SFC-profile which is typical for margarines, expressed as (N5-N20) being less than 10, where N5 and N20 mean the SFC at respectively 5 and 20° C. The structuring properties provided by the fat composition of EP-A-719,090 are mainly attributed to the presence of 1.5-4 wt. % of behenic acid in the fat. Water in oil emulsions prepared from these fats show a good hardness. When producing the spread, the fat, water and some of the other ingredients and additives are mixed and pasteurized at 85° C., followed by a cooling and crystallization process.

EP-A-875,152 relates to lamination fats with improved lamination properties, good structuring properties, in particular a good hardness and a low saturated fatty acid content. According to EP-A-875,152 this is achieved by the presence of a minimum amount of long chain fatty acids in the triglycerides, in particular by the presence of a minimum amount of arachidic and behenic acid. The fat blend further comprises 70-85 wt. % of a liquid oil and at least 15 wt. % of (H2M+H3) triglycerides, and has a saturated fatty acid content of less than 50 wt. %, a N35<35 and an N20 of 15-40 wt. %. In the above, H designates saturated fatty acids with at least 16 carbon atoms, M designates saturated fatty acids with 6-14 C atoms. The blend is characterised by a certain minimum Stevens hardness so that it suitable for use in puff pastry. The Stevens hardness of the fat blend, which is the hardness measured at 20° C. with a Stevens Texture Analyzer using a cylindrical probe of 4.4 mm diameter, is at least 150 g, preferably between 150 and 800 g. The SAFA-content of the fat blends disclosed in the examples ranges from 29 to 35.2%, the solid fat content at 35° C. ranges from 10.6 to 23.3%.

EP-A-687,142 discloses bakery fats with a saturated fatty acid content of less than 40 wt. %, a trans fatty acid content of less than 5 wt. %, a N20 of at least 10%, a S2U content of 5-50 wt. %, a (U2S+U3) content of at least 35 wt. % and a S3 content of 0-37 wt. %. It is explained that the properties of the baked products are at least similar to those of products having a higher saturated fatty acid content. To achieve this, the dough fat contains a fat component A which is rich in SUS-triglycerides and preferably contains 5-30 wt. % of behenic acid. From the examples it can be seen that preparation of the dough is done by blending the molten fat components, followed by cooling the melt and cool storage overnight, so as to obtain a plasticised fat which is suitable for mixing with the remaining dry ingredients of the dough and water.

EP-A-731,645 discloses blends of a sugar and a triglyceride component with a SAFA content which is lower than usual, i.e. below 45 wt. %. The triglyceride component comprises at least 40 wt. % of SU2 and 3-50 wt. % of S2U, it is free of TFA and has an N20 of at least 35 and an N30 of less than 10. It is explained that the triglyceride component contains at least 10 wt. % of behenic acid, that the triglyceride component contains less than 25 wt. % of StUSt (U=Unsaturated Fatty Acid; St=C18-0) and that the presence of 0.1 to 10 wt. % of trisaturated triglycerides, especially from palm oil stearin, gives better structuring properties. The blends are suitable for use in filling fats and ice cream coatings. Regardless of their limited SAFA-content, the blends display a good product performance, meaning an acceptable texture, a sufficiently high hardness and good oral melting characteristics. The fillings and coatings are prepared by mixing the ingredients, roll-refining and conching, followed by a cooling process (called "tempering") to below 20° C., preferably below 15° C. During the cooling process a working amount of fat seeds, e.g. cocoa butter seeds may be added. In the examples it is explained that after cooling and storing of the fillings at low temperature for longer periods (e.g. 16 hrs. at 7° C. followed by 1 week at 13° C. or 18 hrs at 13° C. in case a seeding agent was used), an acceptable hardness was found. Example 4 discloses a filling fat with a Stevens' hardness at 20° C. of 158 g, the filling contained 50 wt. % of fat, the fat contained 41.7 wt. % of SAFA.

From EP-A-1,543,728 a fatty thickening composition is known, which is suitable for thickening a fat based composition. The thickening composition contains between 15 and 45 wt. % of at least one hydrogenated fat and between 85 and 55 wt. % of at least one liquid oil. The hydrogenated fat is preferably a fully hydrogenated fat with at least 15 wt. % of fatty acids having more than 18 carbon atoms, preferably maximum 22 carbon atoms. The preferred hydrogenated fat is hydrogenated high erucic acid rapeseed oil. According to example 1, cooling of a blend of 25 parts fully hydrogenated high erucic acid rapeseed oil with 75 parts of rapeseed oil gives a solid final product.

All of the above-mentioned patent publications address the problem of providing a structuring fat composition which is low in SAFA, which displays an acceptable hardness and is suitable for use in a final product. However, each time this problem is solved by the use of a fat component which contains behenic and/or arachidic acid, i.e. long hydrocarbon chain fatty acids as the structuring agent. Behenic acid is mostly obtained by hydrogenation. Triglycerides containing one or more of these fatty acids risk to create a waxy mouth feel upon eating, caused by their high melting point, as can be seen by their high solid fat content at 35° C. To avoid the presence of high melting triglycerides, containing more than one of these long chain fatty acids, chemical or enzymatic interesterification is often applied, followed by fractionation. However, this is a complicated and expensive production method. On top of that, sources of behenic and arachidic acid are quite expensive, as their availability is quite limited.

EP-A-424,997 describes cocoa butter fractions, obtained by solvent fractionation, using acetone or hexane as a solvent. EP-A-424,997 discloses combining the stearin fraction obtained from the fractionation with a palm mid fraction, with the purpose of producing a replacer fat for at least part of the standard cocoa butter in confectionery applications. The palm mid fraction is a hard fat component which has a saturated fatty acid content of more than 55 wt. % and it is a rich source of POP triglycerides.

FR-A-2,435,206 discloses a tempering type cocoa butter replacer which should contain a certain amount of arachidic acid to render the composition more heat resistant while keeping good melting properties in the mouth. The main triglycerides present in the composition are of the SUS- and SUU-type. An explanation is given as to why other types of triglycerides, like S3, SSU, USU and U3 should be limited. More in particular, it is explained that the amount of U3 triglycerides should be limited to maximum 6 mol %, preferably maximum 4 mol %, as an excessive amount of U3 causes oil exudation or oil bleeding, given the fact that U3 separates easily from the tissular structure of chocolate at room temperature.

GB-A-2,266,217 discloses that addition of a calcium salt and/or a magnesium salt to low calorie chocolate compositions which mainly contain SUS triglycerides, produces a cholesterol reducing effect in blood. The molar ratio of the calcium and/or magnesium salt to the SUS triglyceride varies from 0.5:1 to 2:1. Suitable salts include salts of carbonates, gluconic acid, phosphoric acid, but calcium milk serum, egg shell meal, born meal and fish meal may be used as well.

EP-A-285,422 discloses a hard butter composition which has softness at low temperature, for use in the production of soft chocolate. The purpose is to permit producing chocolate with improved soft mouthfeel at low temperature like 10° C. as well as at the beginning of mastication. The object is to provide soft products which are suitable for consumption by aged persons or persons with bad teeth, which are suitable for use in applications where cracking is to be prevented, for example in coatings for soft centres such as sponge cakes. The difference of the SFI of the hard butter at 5° C. and 25° C. is small. The SFI-temperature curve is shifted towards lower SFI values as compared to cocoa butter. EP-A-285,422 further discloses to use lecithin in the chocolate formulation. Lecithin is an emulsifier which is traditionally used in the preparation of chocolate since it facilitates the coverage of dry ingredient particles by the fat component.

OBJECT OF THE INVENTION

There is thus a need for non-baked food products, which contain glycerides, with a limited content of saturated and/or trans fatty acids, which are structured, which show a hardness that is sufficiently high and appropriate for the intended application. There is also a need to a process for producing such non-baked food products.

It is therefore an object of the present invention to provide structured non-baked food products with a hard and snappy texture, a good mouthfeel, a good taste, a good heat resistance and a good nutritional profile. In particular it is an object of this invention to provide a structured non-baked food product with a harder structure than could be expected on the basis of the glyceride composition contained in it, in particular on the basis of the saturated and trans fatty acid content.

It is a further object of this invention to provide a process for the production of such a structured non-baked food product, which show a sufficient hardness at a concentration of saturated and trans fatty acids that is significantly smaller than can be expected from the prior art knowledge.

DESCRIPTION OF THE INVENTION

This object is achieved according to the present invention, with a structured food product showing the technical features of the characterizing part of the first claim.

Thereto, the structured food product of this invention is characterised in that it contains between 20 and 100% of a fat phase and between 0 and 15% of water, whereby the fat phase contains at least one fat composition containing
- between 10 and 55 wt % of at least one liquid oil with a saturated fatty acid content of less than 25 wt. % with respect to the weight of the liquid oil
- between 45 and 90 wt. % of a hard fat component with a StOSt/POP ratio of at least 2, preferably at least 2.5, most preferably at least 3.0, wherein St is stearic acid, P is Palmitic acid and O is Oleic acid.

In the above, liquid oil includes triglyceride compositions as well as diglyceride compositions or a mixture thereof, which is liquid at room temperature.

It was found that structured food products, in particular tempered food products, maintain a hard and snappy structure and a good heat resistance when a part of the hard fat present in the food product is replaced by a certain amount of liquid oil. This replacement of hard fat by liquid oil is done with the purpose of decreasing the saturated fatty acid content of the structured food product, and can be done on the condition that also part of the original hard fat originally present in the food product is replaced by another hard fat having a high StOSt and low POP-content, as appears from the StOSt and POP content claimed in claim 1.

Contrary to EP-A-285,422 which aims at providing products which are soft even at lower temperatures, it is the object of the current invention to provide structured food products. Within the framework of this invention a "structured food product" means a product which has a solid and hard texture at room temperature, which cannot easily be deformed without breaking. Soft products to the contrary are plastic and flexible, they can easily be deformed without breaking and are not considered to be structured food products. Structured food products that are snappy are characterised by the fact that they break at the first bite. A typical example of a structured food product is traditional chocolate, which is snappy and has tendency to crack at biting. Such structured products show a tendency to crack when texture is measured at room temperature (20° C.+/−1° C.), using an SMS-texture meter equipped with a cylindrical steel probe with a diameter of 3 mm and a flat bottom as described below. Soft products can be penetrated by the probe without breaking. In case of soft coatings, the coating does not fragment into pieces upon cutting with a knife. Within the scope of this invention structured food products designate products with a hardness and texture that is comparable to chocolate. The importance of hardness, snap and crack at biting as traditional quality attributes for chocolate products, is widely recognised in patent literature and is for example disclosed in U.S. Pat. No. 4,873,109 p. 8 table 5; EP-A-23,062 p. 20 table 6;U.S. Pat. No. 4,199,611 p. 10 table 3). However all products known today, showing such characteristics of hardness and snap, contain high amounts of saturated fatty acids. In fact, maintaining a hard texture while reducing the SAFA-content are two conflicting interests.

Within the scope of the present invention, "structured food products" preferably designates products which show a texture of at least 3000 g, preferably at least 4500 g, when measured with a texture meter equipped with a cylindrical probe. The probe penetrates the product to be measured; the resistance produced by the product upon penetration is measured. To permit comparison of subsequent measurements, it is preferred to use standard circumstances and standardised products. Thereto, according to the present application use is made of a standard method applying an SMS-texture meter, with a probe of 3 mm diameter, which is advanced to penetrate the food product at a speed of 0.5 mm/sec. The measurement is carried out using standard tablets, with a thickness of 7 mm. When measuring the texture, the tablets are supported by a metal ring of 8 mm height, so that the bottom of the tablet, at the area where the probe penetrates, does not touch the surface of the measuring table of the instrument. The texture corresponds to the maximum resistance measured before cracking or full penetration of the tablet by the probe.

The above-described texture measurement is suitable for use with products which are available in such a way that they may be easily converted into 7 mm thick tablets. The structured food product of this invention may however also take the shape of a thin chocolate coating, or of a compound applied to a substrate, of a chocolate or compound used as a thin shell around a centre cream or filling, or the chocolate or compound may form part of a composed product or be present in a form unsuitable for the above-described standard texture measurement. In cases where the measurement can not be done on the product as such, the chocolate or compound part to be measured is removed from the composed product, molten and shaped into a standard tablet. In this procedure tempering is applied, preferably by using a temper seed, i.e. a product containing a sufficient amount of Beta-crystals to induce crystallisation of the chocolate or compound in its stable crystal form. The tablets are stabilised for 1 week at 20° C., and the texture is measured applying the above procedure.

The structured food product of this invention contains between 20 and 100% of the above described fat phase, between 0 and 15% of water, and will usually contain between 0-80 wt. % of dry ingredients. Dry ingredients suitable for use within the product of this invention include sugar, cocoa powder, full or skimmed milk powder, whey powder, starch, flour, food grade organic and inorganic powders, etc.

According to a preferred embodiment, to provide optimum results in terms of hardness versus low SAFA content, the fat phase contains at least one fat composition containing
- between 10 and 50 wt %, preferably between 15 and 45 wt. % of the at least one liquid oil, between 50 and 90 wt. % of the hard fat component, preferably between 55 and 85 wt. %.

Preferred structured food products contain between 20-50 wt. % of the fat phase with respect to the total weight of the food product, preferably 20-40 wt. %, more preferably 20-35 wt. %. Examples of such structured food products are chocolate products like tablets or couvertures. The term "chocolate" designates products such as chocolate according to the Codex Alimentarius definition, but also chocolate imitation products containing fats that can fully or partially replace cocoa butter.

The saturated fatty acid content on total fat in the structured food product is preferably below 57 wt. %, preferably less than 55 wt. %, more preferably less than 53, most preferably less than 50. In order to obtain hard and snappy products which give a good melting in the mouth, preferably the saturated fatty acid content will be higher than 35 wt. %, more preferably higher than 40 wt. %, most preferably higher than 45 wt. %. By limiting the SAFA content, the nutritional properties of the structured food product of this invention may be improved. The inventors have observed that the loss in hardness caused by reduction of the hard part concentration in the food product, can be compensated for by adjusting the StOSt/POP ratio of the food product. The inventors have found that this permits producing products with a high hardness, which cannot be expected when looking to the SAFA-content of the fat.

The structured food products according to this invention are preferably tempered products. This ensures maximum hardness and minimum risk to graininess through re-crystallisation of the fat.

The at least one fat composition contained in the fat phase, wherein the at least one fat composition is the combination of the hard fat and the liquid oil, will preferably have a solid fat content (SFC) at 20° C. of at least 50%. The presence of a sufficient amount of solid fat in this fat composition at room temperature, ensures good snappiness of the food product.

Preferred hard fat components for use with the present invention include cocoa butter stearine, shea stearine, illipe, sal stearine, mango stearine, kokum, allanblackia fat or an enzymatically prepared fat containing at least 60 wt % of SUS triglycerides or a blend of two or more of the afore mentioned fats or fractions thereof. Herein S means saturated fatty acids having 16-18 carbon atoms and U means unsaturated fatty acids having 18 carbon atoms or more. Fractionation can be dry or solvent fractionation. All these products have a relatively high amount of StOSt and a limited content of POP.

Most preferred is a hard fat component consisting of a hard cocoa butter fraction, obtained through dry or solvent fractionation, in particular the stearin fraction. The purpose of this fractionation is to increase as much as possible the StOSt-level in the cocoa butter part and to decrease the POP-level. This was found to have a very positive effect on texture. A reason to use this type of fat is that the amount of cocoa solids in the chocolate like product remains quite high. This can be an advantage for product labeling.

Optimum hardness and snappy texture, with simultaneously a reduced level of saturated fatty acid could be obtained with hard fat having a content of StOSt-triglycerides between 60 and 85 wt %.

It was found that a product with an optimum balance between hardness and snap on the one hand and nice and cool melting properties in the mouth on the other hand can be obtained if the hard fat component contains a sufficient amount of StOSt- as well as POSt-triglycerides. Apparently StOSt creates more hardness, whereas POSt gives a nicer mouthfeel. The optimum between both properties is obtained if the POSt/StOSt ratio varies between 0.3 and 1.1, preferably between 0.5 and 0.9.

The inventors have observed that the addition of a powder of a salt or a mineral powder or a mixture of those has a positive effect on the hardness of the final product obtained. The mineral powder or salt is preferably a compound of an element selected from the group of calcium, magnesium, potassium, iron, silicium and phosphor or mixtures of two or more. The amounts added typically range from 0.05 to 5 wt. % with respect to the total weight of the composition. Preferably the average particle size of these mineral powders or salts is less than 15 µm, preferably less than 10 µm, more preferably less than 5 µm.

In order to obtain a texture with optimum hardness, it is preferred that the dry ingredients contained in the recipe, have a small particle size. Preferably the amount of dry, fat free material, with a particle size of less than 15 µm is more than 30 wt. %, more preferably more than 50 wt. %, most preferably more than 70 wt. %.

Certain additives have a positive effect on the hardness and structure of the final product since they limit the growth of fat crystals. Therefore, the structured food product of this invention preferably contains an amount of a fat crystal growth limiting agent. It is believed that this has a beneficial effect on the structure. The crystal growth limiting agent may have a direct effect on crystal growth and/or an indirect effect e.g. by creating a stronger nucleation effect, with the result that the number of crystals will be higher, but their size will be smaller.

Additives used for this purpose, mostly belong to the product classes of gums, polysaccharides, proteins of vegetable or animal origin, emulsifiers or a combination thereof. Preferably the amount of crystal growth limiting agent ranges from 0.05 to 5.0 wt. % based on total food product weight. The crystal growth limiting agent is preferably selected from the group of gum, polysaccharide, at least one protein of vegetable or animal origin, an emulsifier, a polymer, or a mixture of two or more thereof.

A further improvement of the texture can be achieved by the incorporation of a texturising or emulsifying agent or a combination of such agents like sorbitan tristearate, mono- and diglycerides, animal and vegetable proteins (milk, soy, wheat, . . . ), gelatine, pectine, starch, modified starch, agar, xanthane gum, carrageen, alginates, guar, cellulose based materials etc. or any other texturising or emulsifying agent considered suitable by the person skilled in the art. An example of a texturising agent that was found particularly suitable for use in the structured food product of this invention is microcrystalline cellulose. The amount of texturising agents may vary within wide ranges, and preferably varies from 0.1 to 20 wt. % with respect to the total weight of the composition of, more preferably between 0.5 and 10 wt %, most preferably between 1 and 5 wt %.

Within the scope of the present invention the liquid oil is preferably a natural oil or a fraction of a natural oil. Preferably the natural oil is obtained by pressing or extracting oil bearing fruits, oil seeds, nuts, kernels, grains, etc., the liquid oil having a SAFA content of less than 20 wt. %, preferably less than 15 wt. %.

Preferred liquid oil components for use in the structured food product of this invention include at least one vegetable oil selected from the group of rapeseed oil, corn oil, soy oil, standard or high oleic sunflower seed oil, cotton seed oil, maize oil, olive oil, hazelnut oil, groundnut oil, liquid fractions of palm oil or shea butter, a fraction of one of these liquid oils or one or more fractions thereof or a blend of two or more of the afore mentioned oils and/or fractions.

It has surprisingly been found that seed and nut oils, which are typically characterised by a high amount of U3 triglycerides, are particularly suitable for producing structured food products with a hard texture, such as for instance imitation chocolate. The thus obtained imitation chocolates have a stable structure as a function of time, without any signs of oil bleeding when stored at room temperature. This is unexpected in view of FR-A-2,435,206. The fact that seed and nut oils have a high U3 content can be read from The Lipid Handbook, by F D Gunstone et Al, $2^{nd}$ edition, p. 121.

In order to obtain a structured food product with a good taste and structure, some liquid oils are preferred over others. It was found that preferably the ratio of the C18-3 content on total fat in the product over the sum of C18-2+C18-3 is less than 0.25, preferably less than 0.15, most preferably less than 0.05. Oils that can be used to fulfil such requirement are for instance sunflower oil, high oleic sunflower oil, groundnutoil, hazelnutoil. An oil that does not fulfil this requirement is rapeseedoil. Results in terms of taste and structure were found to be less satisfactory with this oil.

The structured food product of this invention preferably contains less than 5 wt. %, more preferably less than 2 wt. % of trans fatty acids, expressed on the total fat content of the food product. Since trans fatty acids are known to have a negative effect on cholesterol levels in the blood, there use should be minimised.

The use of hydrogenated fats in the structured food product of this invention is preferably avoided, as hydrogenated fat have a bad connotation and are often linked with unhealthy fats with a high trans fatty acid content.

One of the important parameters in categorizing chocolate products is the content of total cocoa solids. With cocoa solids is meant the amount of fat free cocoa solids combined with the amount of cocoa butter. For certain products the minimum amount of solid components originating from cocoa should be at least 15 wt. %, preferably at least 20 wt. %, more preferably at least 25 wt. %, most preferably at least 35 wt. %. It can be an advantage to have these minimum levels present in the product of this invention. The inventors have found that by using a substantial amount of cocoa butter stearine in the recipe, the amount of saturated fatty acid present in the food product may be reduced, while still a high amount of cocoa solids may be maintained.

The present invention also relates to a process for producing the above-described structured food product. This process comprises the steps of blending between 10 and 55 wt. % of at least one liquid oil with a saturated fatty acid content of less than 25 wt. % with respect to the weight of the liquid oil between 45 and 90 wt. % of a hard fat component with a StOSt/POP ratio of at least 2, preferably at least 2.5, most preferably at least 3.0.

to provide a fat phase and blending between 20 and 100 wt. % of the fat phase with 0-80 wt. % of dry ingredients and with 0-15 wt. % of water, followed by subjecting the thus obtained food product to a tempering step to stabilise the fat. During tempering, the food product is mostly subjected to a series of consecutive heating and cooling steps. The tempering step is advantageously followed by a step for cooling the product, mostly a forced cooling step. Dry ingredients suitable for use within the product of this invention include sugar, cocoa powder, full or skimmed milk powder, whey powder, starch, flour, food grade organic and inorganic powders, etc.

In most cases tempering will be done by means of a tempering machine. In this equipment the product is first cooled, followed by a slight heating in order to melt unstable crystals, followed by a final cooling in order to obtain a product that is stabilised and still can be poured in moulds or to cover products like biscuits.

Tempering can also be achieved by the addition of a temper seeding agent to the above-described blend, wherein the temper seeding agent contains at least 50 wt. % of SUS triglycerides on its total fat basis. In this case the temper seed contains the SUS-triglycerides in the stable form and will act as a seeding agent and induce crystallisation of the liquid fat in the stable form. With stable form is meant the type Beta V or VI, as defined by Wille & Luton.

The process of this invention preferably contains at least one step for reducing the size of any fat crystals present in the food product, the fat crystal size reduction step being carried out before or during solidification of the food product. This size reduction step may for example comprise high speed mixing, high speed scraping or subjecting the blend to vibrations or ultrasonic treatment, or a combination of two or more of these techniques or using any other technique considered suitable by the person skilled in the art.

According to another preferred embodiment of this invention, at least one refining step is carried out before, during or after preparation of the blend of ingredients, to reduce the size of any solid material present. This size reduction has the effect that the hardness of the final food product is increased. In this context, refining means process steps like for instance grinding, roll refining, etc. or any equivalent process known to the person skilled in the art capable of reducing the particle size of solid materials present in the recipe. For instance, it is possible to fine grind the sugar used in the recipe in advance before blending with the other ingredients, or to grind the sugar together with other ingredients like cocoa powder or milk powder, possibly after having added some fat to facilitate the grinding process, like for instance roll refining.

The present invention also relates to a process for preparing a fat phase for use in the above described structured food product, comprising the steps of blending between 10 and 55 wt % of at least one liquid oil with a saturated fatty acid content of less than 25 wt. % with respect to the weight of the liquid oil between 45 and 90 wt. % of a hard fat component with a StOSt/POP ratio of at least 2, preferably at least 2.5, most preferably at least 3.0.

The present invention is further illustrated in the examples described below.

EXAMPLES

Example 1

A cocoa butter stearin was produced by solvent fractionation in acetone at a temperature of 18° C., applying a solvent to fat ratio of 7/1 (fat A in Table 1).

The characteristics of the starting cocoa butter (fat B) and the obtained stearin fraction (fat A) are given in table 1. From the results given in table 1 it becomes apparent that fractionation increases the StOSt content of the fat and decreases the POP-content. (St=stearic acid; P=Palmitic acid; O=Oleic acid). The StOSt/POP ratio changes from 1.4 for the cocoa butter to 4.8 for the stearin fraction.

The thus obtained cocoa butter stearin was used to prepare a first chocolate mass according to the recipe given in Table 2.

A second chocolate mass was produced, using high oleic sunflower oil as fat in stead of cocoa butter. Of course the chocolate mass contained a limited amount of cocoa butter which originates from the cocoa powder (11%).

The chocolate mass was prepared by blending the cocoa powder, the sugar and part of the fat, followed by roll refining the mixture, and treating the mixture in a conche at 50° C. where the residual fat was added and mixed into the blend.

TABLE 1

|  | fat A<br>CB stearin | fat B<br>CB reference |
|---|---|---|
| FAC |  |  |
| C16 | 16.02 | 25.32 |
| C18 | 48.78 | 35.7 |
| C18-1 | 32.45 | 33.91 |
| C18-2 | 0.77 | 3.04 |
| C18-3 | 0 | 0 |
| TAG |  |  |
| POP | 9.03 | 18.54 |
| POSt | 39.3 | 38.92 |
| StOSt | 43.53 | 25.96 |
| StOSt/POP | 4.8 | 1.4 |

TABLE 2

| Cocao powder | 15% |
|---|---|
| sugar | 50% |
| fat | 35% |
| lecithin | 0.10% |

Example 2

A second chocolate mass was prepared according to the recipe of table 2, however using liquid oil as the fat component.

A chocolate mass was made by blending 69 wt. % of the first cocoa butter stearin based chocolate mass obtained in example 1, with 31 wt. % of the second chocolate mass based on liquid oil. The thus obtained product contained 49.1 wt. % of saturated fatty acids (see sample 1, table 3). The thus obtained chocolate mass was tempered by cooling to 30° C. and adding 0.2% Chocoseed A. Chocoseed A is a product of Fuji Oil containing a minimum working amount of SUS-triglyceride, crystallised in the Beta-form.

A standard reference chocolate mass was made according to the above-described recipe, by using as a first chocolate mass the non-fractionated cocoa butter in stead of the cocoa butter stearin fraction.

The chocolate mass was poured in moulds to make tablets and cooled for 30 minutes at 15° C., followed by demoulding and storage for 1 week at 20° C. to stabilise. The thickness of the tablets was 7 mm.

After 1 week the tablets were tasted by a test panel and their texture was measured with an SMS-texture meter, using a probe of 3 mm diameter, speed 0.5 mm/sec. To measure the texture, the tablets were put on a metal ring of 8 mm height, so that the bottom of the tablet, at the area where the probe penetrates, did not touch the surface of the measuring table of the instrument. The texture corresponds to the maximum resistance measured before cracking or full penetration of the tablet by the probe. The results obtained are given in table 3.

TABLE 3

|  | SAFA | Texture (g) |
|---|---|---|
| sample 1 | 49.1% | 5272 |
| reference | 61.6% | 7308 |

The panel evaluated the low SAFA sample 1 as hard, snappy, and having good and clean melting in the mouth. The low SAFA chocolate was considered as fully acceptable and in line with the reference sample.

Table 6 below shows the composition of the total fat phase of the reference sample and sample 1.

Comparative Example A

A cocoa butter stearin was produced by solvent fractionation in acetone of the cocoa butter of example 1, at a temperature of 14° C., applying the same solvent to fat ratio as in example 1. The characteristics of the stearin fraction obtained (fat C) are given in table 4.

TABLE 4

|  | fat C<br>CB stearin |
|---|---|
| FAC |  |
| C16 | 23.18 |
| C18 | 41.03 |
| C18-1 | 32.53 |
| C18-2 | 1.44 |
| C18-3 | 0 |
| TAG |  |
| POP | 14.14 |
| POSt | 43.74 |
| StOSt | 34.27 |
| StOSt/POP | 2.4 |

As can be seen from the comparison of table 1 and table 4, fat C is less far fractionated than sample A. The StOSt/POP ratio of the stearin fraction fat C is only 2.4 as compared to 4.8 for fat A.

A first chocolate mass was prepared with the pure stearin fat C, as described in example 1, applying the recipe of table 2. The thus obtained chocolate mass was blended with the second chocolate mass which contained exclusively liquid oil as the fat component as described in example 2. The first and second chocolate mass were blended to obtain a final product with a reduced saturated fatty acid (SAFA) content (sample 2 containing 47.9% SAFA).

Tablets made with this chocolate were evaluated as described in example 2. The results of texture measurements are given in table 5.

TABLE 5

|  | SAFA | Texture (g) |
|---|---|---|
| sample 2 | 47.9% | 4061 |

The low SAFA chocolate sample 2 was evaluated by the test panel as "too soft, too plastic and not snappy" in comparison to the products of example 2. The mouthfeel was described as "oily and greasy". Remarkably, contrary to sample 1 and the reference sample, sample 2 did not break during the texture measurement. The probe of the texture meter was only capable of producing a hole in the tablet and passed through the tablet without fragmenting it. This observation is in line with the observation of the panel that the product was not snappy.

Table 6 below shows the composition of the total fat phase of sample 2.

TABLE 6

|  | sample 1 | sample 2 | ref |
|---|---|---|---|
| FAC |  |  |  |
| C16 | 12.82 | 17.26 | 25.32 |
| C18 | 34.58 | 28.92 | 35.7 |
| C18-1 | 48.31 | 49.13 | 33.91 |
| C18-2 | 2.42 | 2.93 | 3.04 |
| C18-3 | 0.03 | 0.03 | 0 |
| TAG |  |  |  |
| POP | 6.97 | 10.14 | 18.54 |
| POSt | 27.81 | 30.12 | 38.92 |
| StOSt | 29.94 | 23.35 | 25.96 |
| U3 | 22.29 | 23.31 | 0.49 |
| StOSt/POP | 4.3 | 2.3 | 1.4 |
| U3/POP | 3.2 | 2.3 | 0.03 |
| StOSt + U3 | 52.2 | 46.7 | 26.5 |

Example 3

A first chocolate mass was prepared as described in example 2 according to the recipe of table 2, using as a hard fat component an enzymatically prepared StOSt-type fat, with a StOSt/POP ratio of 135, a saturated fatty acid content of 63% and an IV of 32.5 (fat D). A second chocolate mass was prepared according to the recipe of table 2, however using liquid oil as the fat component. The first and second chocolate mass were blended to make samples 3 and 4. Tablets were made and the texture was measured after 1 week stabilisation at 20° C. Results are given in table 7.

TABLE 7

|  | SAFA | Texture (g) |
|---|---|---|
| sample 3 | 50% | 6112 |
| sample 4 | 55% | 8309 |

Although the saturated fatty acid content of the fat in the chocolate samples was clearly lower than the one in standard chocolate, a chocolate product was obtained with a texture quite comparable to chocolate products made with standard cocoa butter. This can be seen by comparing figures in table 7 versus table 3. Samples 3 and 4 were tasted by a test panel and found to be snappy, good melting and not waxy.

Example 4

Chocolate products were prepared according to the recipe in table 8.

TABLE 8

| Cocao liquor | 38% |
|---|---|
| sugar | 48% |
| fat | 14% |
| lecithin | 0.40% |

Two different fats were used:
fat E which is a combination of an enzymatically prepared StOSt-type fat with high oleic sunflower oil. The enzymatically prepared fat was the same as the one used in example 3. Fat E had a saturated fatty acid content of 51% and an SFC at 20° C. of 60.7% (measured according to IUPAC-method 2.150 A).
fat F which is a combination of the same enzymatically prepared StOSt-type fat with a hard palm fraction with IV 34. Fat F had a SAFA content of 63%.

Chocolate sample 6 was prepared starting from fat E, sample 7 starting from fat F. Sample 6 is a product according to the invention, sample 7 is a comparative sample. The characteristics of the chocolate products were as follows:

TABLE 9

|  |  | Texture (g) | | |
|---|---|---|---|---|
|  | SAFA | 20° C. | 25° C. | 28° C. |
| sample 6 | 57% | 7775 | 5604 | 2807 |
| sample 7 | 62% | 9738 | 6210 | 2891 |

The hardness of the tablets was measured after 2 weeks stabilisation at 20, 25 and 28° C. The tablets, stored at 20° C., were then also tasted by a panel. The products were described as good melting, not waxy and having a good hardness and snap. As can be seen from the texture measurements, sample 6 and 7 had a comparable heat resistance.

The tablets were stored at different temperatures and were kept several weeks for evaluation of blooming. A score for blooming was given from "−" indicating no blooming, "+/−" start blooming, to "++++" indicating very strong blooming. The results obtained are given in table 10. Table 10 shows that sample 6 has a good stability and heat resistance.

TABLE 10

|  | 20° C. | | 25° C. | | 28° C. | |
|---|---|---|---|---|---|---|
| Blooming | sample 6 | sample 7 | sample 6 | sample 7 | sample 6 | sample 7 |
| 1 week | − | − | − | − | − | − |
| 2 weeks | − | − | − | − | − | − |
| 3 weeks | − | − | − | − | − | − |
| 4 weeks | − | − | − | − | − | − |
| 5 weeks | − | − | − | − | − | − |
| 6 weeks | − | − | − | − | − | +/− |
| 7 weeks | − | − | − | − | − | +/− |
| 8 weeks | − | − | − | − | − | + |
| 9 weeks | − | − | − | − | − | + |
| 10 weeks | − | − | − | − | − | ++ |

Example 5

The test of example 3 was repeated, but the second chocolate mass was made using rapeseed oil instead of high oleic sunflower oil. Again samples were prepared with 50 and 55 wt % saturated fatty acid. Tablets were kept for 1 week at 20° C. and texture was measured. Results are given in table 11.

TABLE 11

|  | SAFA | Texture (g) |
|---|---|---|
| sample 8 | 50% | 4479 |
| sample 9 | 55% | 6037 |

As can be seen from table 11, the structure of the products obtained was weaker than the one of samples 3 and 4. During texture measurement tablet 9 broke into two pieces, whereas in the case of tablet 8 the probe made a hole in the tablet, without breaking it. Upon tasting of the samples by a test panel sample 8 was tasted as not snappy, sample 9 was evaluated as snappy. However the taste of sample 8 and 9 was evaluated clearly inferior to the samples 3 and 4.

Example 6

Similar to example 3 and using the recipe of table 2, two chocolate masses were prepared with a SAFA-content on total fat of 45 wt. %, by using the enzymatically prepared StOSt-type fat as hard fat for sample 10 and Illipe-fat as a hard fat for sample 11. The POSt/StOSt ratio of these fats were respectively 0.17 and 0.86.

Tablets were prepared and stored for 1 week at 20° C. Then the tablets were compared in a sensory evaluation by a taste panel of 8 persons. They were asked to give a score from 0 to 5 for hardness and snap as well as for melting properties in the mouth and to indicate which product they preferred. The average results were as follows:

TABLE 12

|  | sample 10 | sample 11 |
|---|---|---|
| hardness | 3.0 | 2.6 |
| mouthfeel | 1.9 | 2.8 |
| preference |  | 8 x |

Sample 11, though slightly less snappy, was preferred by each of the panel members, since it had "cleaner and cooler" melting properties in the mouth.

Example 7

Two chocolate masses were prepared according to the recipe in table 2, each containing 45 wt. % of SAFA (saturated fatty acids) on fat basis, by using a combination of an enzymatically prepared StOSt-type fat as a hard fat with high oleic sunfloweroil.

Then, cocoa powder, sugar and part of the fat were blended in order to obtain a mass containing 25 wt. % of fat. This mass was then roll refined on a Lehmann WDL-H type lab refiner. The remainder of the fat was added during conching at 50° C., after roll refining had been finished. For the roll refining two different procedures were used:
sample 12-A: the blend was roll refined once using a roll pressure of 45 bar.
sample 13-A: the blend was roll refined 3 times applying a roll pressure of 95, 105 and 115 bar respectively.

The particle size of samples 12-A and 13-A was determined using a sieve of 15 μm. Measurement was done on samples diluted in acetone (2 g. in 300 ml.). The fraction smaller than 15 μm was on defatted weight basis for sample 12 A 26.2 wt. % and for sample 13A 51.6 wt. %.

Then, the chocolate masses were tempered and tablets were made, which were then stored for 1 week at 20° C.

Two other chocolate masses 12-B and 13-B were produced applying the same preparation conditions and the previous recipe, except that 2.5 wt. % of sugar and 2.5 wt. % of cocoa powder were replaced by 5 wt. % of a texturising agent Meripro 430, produced by Tate & Lyle. After storing for 1 week the hardness of the tablets was measured at 20° C. with an SMS-texturemeter, equipped with a cylindrical probe of 3 mm diameter. The tablets were also tasted. The results were as follows:

TABLE 13

| texture measurements. | | | |
|---|---|---|---|
| sample 12 A | sample 12 B | sample 13 A | sample 13 B |
| 2747 | 2868 | 3963 | 4079 |

During texture measurements tablets 12A and 12B did not break, whereas tablets 13 A and 13 B did break. The taste panel considered samples 12A and B as soft, while samples 13A and B were acceptable in hardness.

From these results it can be concluded that the particle size has quite a strong influence on the hardness of the final product. The texturising agent gave only a limited improvement.

Samples 13 A and 13 B were stored for 8 months in an incubator at 20° C. The hardness of the tablets was measured as described above and very similar results were found of 4012 and 4011 g respectively. The tablets did not show any visual sign of fat blooming or oil exudation. The latter was also tested by laying the tablets for 3 hours on a sheet of paper in a room at 23° C. Afterwards the paper was controlled for traces of oil absorption, but none could be detected.

Example 8

A chocolate mass was prepared according to the recipe of table 2, containing 45 wt. % SAFA on fat basis, using a combination of an enzymatically prepared hard StOSt-type fat and high oleic sunflower oil. After roll refining, the mass was split into two parts. To one of the parts 3 wt. % of $CaCO_3$ was added (calculated on total recipe basis) as a fine powder. Both parts were conched while adding the remaining fat, followed by cooling, tempering and moulding. After 1 week the hardness of the tablets was measured at 20° C. Results are given in table 14. Sample 14 did not contain $CaCO_3$; sample 15 contained $CaCO_3$. Both samples were tasted, sample 14 was considered as too soft, while sample 15 was found to be snappy.

TABLE 14

| texture measurements. | |
|---|---|
| sample 14 | sample 15 |
| 2955 | 4065 |

Example 9

Two chocolate masses, sample 16 and sample 17 were produced according to the recipe of table 15 below.

TABLE 15

| recipes for samples 16 and 17. | | |
|---|---|---|
|  | Sample 16 | Sample 17 |
| Sugar | 50 | 47.5 |
| Cocoa powder | 15 | 12.5 |
| Fat mixture | 35 | 35 |
| Lecithin | 0.5 | 0.5 |
| Pectacon M-4924 | — | 5 |

Pectacon M-4924 is a texturising agent produced by Acatris and consists of wheypowder, microcrystalline cellulose and sodiumcarboxymethylcellulose. The fat mixture used in this example was a blend of POSt-rich fat, enzymatically prepared StOSt-type fat and high oleic sunflower oil. The fat mixture used in this example contained 45 wt % SAFA on fat basis.

First sugar, cocoa powder, part of the fat and if needed Pectacon M-4924 were blended in order to obtain a mass containing 25 wt % of fat. Afterwards this blend was roll refined twice on a Lehmann WDL-H type lab refiner using 90-100 bar and 115-125 bar. The remainder of the fat was added during conching at 50° C., after roll refining had been finished.

Both chocolate masses sample 16 and 17 were tempered with 0.2% Chocoseed A, poured in moulds to make tablets and cooled for 30 minutes at 5° C. followed by 30 minutes at 15° C. After de-moulding, the tablets were stored at 20° C. to stabilise followed by regular hardness measurements with an SMS-texture meter, equipped with a cylindrical probe of 3 mm diameter (table 16).

TABLE 16 hardness measurements of sample 16 and 17

|  | Sample 16 | Sample 17 |
|---|---|---|
| After 1 week stabilisation | 3168 | 3322 |
| After 2 weeks stabilisation | 3132 | 3326 |
| After 4 weeks stabilisation | 3006 | 3281 |

From table 16 it appears that both samples 16 and 17 can be considered as hard chocolate masses within the scope of this invention. From these samples it appears that a texturising agent such as for example Pectacon M-4924 is capable of improving the hardness of the tablets.

Example 10

Sometimes the standard texture measurement as disclosed in the description, cannot be carried out on the product as it is. This is for example the case with a thin chocolate coating or compound coating on a biscuit, where the coating has a thickness of 1 mm or less and has to be removed from the composed product before any measurement can be carried out.

In such cases the procedure is as follows. First, the component to be measured is isolated from the composed product and molten. The molten component is subjected to tempering, preferably by adding an amount of a temper seed. The molten product is converted into standard tablets. The texture is measured by subjecting these tablets to the standard texture measurement described above.

To evaluate this procedure a chocolate mass was made using the recipe in table 17.

TABLE 17 recipe

| Cocoa Liquor | 19% |
|---|---|
| Cocoa Powder | 11% |
| Sugar | 46.5% |
| Fat mixture | 23% |
| Lecithin | 0.5% |
| Vanillin | 0.02% |

The fat mixture was a blend of enzymatically prepared StOSt-fat and high oleic sunflower oil and contained 50 wt % SAFA on fat basis. The chocolate mass was tempered at 30° C. by adding 0.2 wt. % of Chocoseed A, poured in moulds and cooled at 15° C. for 30 minutes. After two weeks stabilisation at 20° C. the hardness was measured using the standard procedure (sample 18).

After having been subjected to tempering, the thus obtained chocolate mass was also used to coat a thin layer on 'Petit Beukelaer' biscuits. After cooling at 15° C. for 30 minutes and a stabilisation period of 2 weeks the coating was scraped off, melted, tempered with Chocoseed A, poured in moulds and cooled at 15° C. for 30 minutes. After two weeks stabilisation at 20° C. the hardness was measured using the standard procedure (sample 19). Both hardness measurements are shown in table 18.

TABLE 18 hardness measurements

| Sample 18 | Sample 19 |
|---|---|
| 3696 | 3412 |

From this comparison it is clear that the above described procedure is suitable for measuring the hardness of a product, where the standard procedure is not available or difficult to execute.

The invention claimed is:

1. A structured food product with a hard texture, containing between 20 and 100% of a fat phase and between 0 and 15% of water, whereby the fat phase contains
   between 10 and 55 wt % of at least one liquid oil with a saturated fatty acid content of less than 25 wt. % with respect to the weight of the liquid oil, and
   between 45 and 90 wt. % of a hard fat component with a StOSt/POP ratio of at least 2, wherein St is stearic acid, P is Palmitic acid and O is Oleic acid.

2. The structured food product of claim 1, wherein the fat phase contains
   between 10 and 50 wt % of the at least one liquid oil, and
   between 50 and 90 wt. % of the hard fat component.

3. The structured food product of claim 2, wherein the fat phase contains between 15 and 45 wt % of said liquid oil.

4. The structured food product of claim 3, wherein the fat phase contains between 55 and 85 wt % of said hard fat component.

5. The structured food product of claim 2, wherein the fat phase contains between 55 and 85 wt. % of said hard fat component.

6. The structured food product of claim 1, wherein the food product contains between 20-50 wt. % of the fat phase with respect to the total weight of the food product.

7. The structured food product of claim 6, wherein the food product contains between 20 and 40 wt. % of the fat phase with respect to the total weight of the food product.

8. The structured food product of claim 7, wherein the food product contains between 20 and 35 wt. % of the fat phase with respect to the total weight of the food product.

9. The structured food product of claim 1, wherein the food product contains less than 57 wt of saturated fatty acids with respect to the total weight of the fat phase.

10. The structured food product of claim 9, wherein the food product contains less than 55 wt. % of saturated fatty acids with respect to the total weight of the fat phase.

11. The structured food product of claim 10, wherein the food product contains less than 53 wt. % of saturated fatty acids with respect to the total weight of the fat phase.

12. The structured food product of claim 11, wherein the food product contains less than 50 wt. % of saturated fatty acids with respect to the total weight of the fat phase.

13. The structured food product of claim 1, wherein the food product is a tempered product.

14. The structured food product of claim 1, wherein the at least one fat composition has a solid fat content at 20° C. of at least 50%.

15. The structured food product of claim 1, wherein the hard fat component comprises a fat selected from the group consisting of: cocoa butter stearine, shea stearine, illipe, sal stearine, mango stearine, kokum, allanblackia fat, an enzymatically prepared fat containing at least 60 wt % of SUS triglycerides, one or more fractions of such fats and a blend of two or more of the afore mentioned fats, wherein S means saturated fatty acids having 16-18 carbon atoms and U means unsaturated fatty acids having 18 carbon atoms or more.

16. The structured food product of claim 1, wherein the hard fat component consists of a hard cocoa butter fraction, obtained through dry or solvent fractionation.

17. The structured food product of claim 1, wherein the hard fat component consists of a fat with a content of StOSt-triglycerides between 60 and 85 wt %.

18. The structured food product of claim 1, wherein the hard fat component consists of a fat with a POSt/StOSt ratio of between 0.3 and 1.1.

19. The structured food product of claim 18 wherein the hard fat component consists of a fat with a POSt/StOSt ratio of between 0.5 and 0.9.

20. The structured food product of claim 1, wherein the food product contains between 0.05 and 5 wt. % with respect to the total weight of the composition of a powder of a salt or mineral powder or a mixture thereof of an element selected from the group consisting of: calcium, magnesium, potassium, iron, silicium, phosphor, or mixtures of two or more thereof.

21. The structured food product of claim 20, wherein the powder of the salt or the mineral powder or the mixture thereof has a mean particle size of less than 15 µm.

22. The structured food product of claim 21, wherein the powder of the salt or the mineral powder or the mixture thereof has a mean particle size of less than 10 µm.

23. The structured food product of claim 22, wherein the powder of the salt or the mineral powder or the mixture thereof has a mean particle size of less than 5 µm.

24. The structured food product of claim 1, wherein the food product contains between 0.1 and 20 wt. % of a texturizing agent with respect to the total weight of the composition.

25. The structured food product of claim 24, wherein the food product contains between 0.5 and 10 wt. % of a texturizing agent with respect to the total weight of the composition.

26. The structured food product of claim 25, wherein the food product contains between 1 and 5 wt. % of a texturizing agent with respect to the total weight of the composition.

27. The structured food product claim 24, wherein the texturizing agent is a carbohydrate polymer.

28. The structured food product of claim 27, wherein the carbohydrate polymer is selected from the group consisting of: a starch, a modified starch, cellulose, modified cellulose, microcrystalline cellulose, and a combination of two or more thereof.

29. The structured food product of claim 1, wherein the food product contains an amount of dry ingredients, wherein the amount of dry ingredients with a particle size of less than 15 µm is more than 30 wt. % with respect to the total amount of dry ingredients present in the food product, expressed on a fat free basis.

30. The structured food product of claim 29, wherein the amount of dry ingredients with a particle size of less than 15 µm is more than 50 wt. % with respect to the total amount of dry ingredients present in the food product, expressed on fat free basis.

31. The structured food product of claim 30, wherein the amount of dry ingredients with a particle size of less than 15 µm is more than 70 wt. % with respect to the total amount of dry ingredients present in the food product, expressed on fat free basis.

32. The structured food product of claim 1, wherein the food product contains an amount of a fat crystal growth limiting agent.

33. The structured food product of claim 32, wherein the fat crystal growth limiting agent is present in a concentration of 0.05 to 5.0 wt. % based on total food product weight.

34. The structured food product as claimed in claim 32, wherein the fat crystal growth limiting agent is selected from the group consisting of: gum, polysaccharide, at least one protein of vegetable or animal origin, an emulsifier, a polymer, and mixtures of two or more thereof.

35. The structured food product of claim 1, wherein the liquid oil is a natural oil with a SAFA content of less than 20 wt. %.

36. The structured food product of claim 35, wherein the liquid oil is a natural oil with a SAFA content of less than 15 wt. %.

37. The structured food product of claim 1, wherein the at least one liquid oil component comprises at least one vegetable oil selected from the group consisting of rapeseed oil, corn oil, soy oil, standard and high oleic sunflower seed oil, cotton seed oil, maize oil, olive oil, hazelnut oil, groundnut oil, liquid fractions of palm oil or shea butter, a fraction of one of these liquid oils and one or more fractions thereof and blends of two or more of the afore mentioned oils and/or fractions.

38. The structured food product of claim 1, wherein the fat phase contains fats containing C18-3 and C18-2 fatty acids in such an amount that the ratio of the total C18-3 content of the fat phase over the sum of C18-2+C18-3 is less than 0.25.

39. The structured food product of claim 38, wherein the fat phase contains fats containing C18-3 and C18-2 fatty acids in such an amount that the ratio of the total C18-3 content of the fat phase over the sum of C18-2+C18-3 is less than 0.15.

40. The structured food product of claim 39, wherein the fat phase contains fats containing C18-3 and C18-2 fatty acids in such an amount that the ratio of the total C18-3 content of the fat phase over the sum of C18-2+C18-3 is less than 0.05.

41. The structured food product of claim 1, wherein the food product contains less than 5 wt. % trans fatty acids, expressed on the total fat content of the food product.

42. The structured food product of claim 41, wherein the food product contains less than 2 wt. % trans fatty acids, expressed on the total fat content of the food product.

43. The structured food product of claim 1, wherein the food product is free of hydrogenated fat components.

44. The structured food product of claim 1, wherein the food product contains at least 15 wt % of solid components originating from cocoa.

45. The structured food product of claim 44, wherein the food product contains at least 20 wt. % of solid components originating from cocoa.

46. The structured food product as claimed in claim 45, wherein the food product contains at least 25 wt. % of solid components originating from cocoa.

47. The structured food product of claim 46, wherein the food product contains at least 35 wt. % of solid components originating from cocoa.

48. The structured food product of claim 1 wherein the hard fat component has a StOSt/POP ratio of at least 2.5.

49. The structured food product of claim 48 wherein the hard fat component has a StOSt/POP ratio of at least 3.0.

50. A process for producing a structured food product wherein the process comprises the steps of blending
between 10 and 55 wt. % of at least one liquid oil with a saturated fatty acid content of less than 25 wt. % with respect to the weight of the liquid oil, and
between 45 and 90 wt. % of a hard fat component with a StOSt/POP ratio of at least 2, to provide a fat phase, and blending between 20 and 100 wt. % of the fat phase with 0-80 wt. % of dry ingredients and 0-15 wt. % of water, followed by subjecting the thus obtained food product to a tempering step.

51. The process of claim 50, wherein tempering is carried out by adding to the food product a temper seeding agent containing at least 50 wt. % SUS with respect to the fat content of the temper seeding agent.

52. The process of claim 51, wherein tempering is carried out using a tempering device.

53. The process of claim 50, wherein the process contains at least one step in which the size of any fat crystals present is reduced, the fat crystal size reduction step being carried out before or during solidification of the food product.

54. The process of claim 53, wherein the crystal size reduction step comprises a step selected from: high speed mixing, high speed scraping, subjecting the food product to vibrations, subjecting the food product to ultrasonic treatment, and combinations of two or more of these steps.

55. The process of claim 50, wherein at least one refining step is carried out before, during or after preparation of the blend of ingredients, to reduce the size of any solid material present.

56. The process of claim 50, wherein the hard fat component has a StOSt/POP ratio of at least 2.5.

57. The process of claim 56, wherein the hard fat component has a StOSt/POP ratio of at least 3.0.

58. The process for preparing a fat phase for use in a structured food product wherein the process comprises the steps of blending
    between 10 and 55 wt % of at least one liquid oil with a saturated fatty acid content of less than 25 wt. % with respect to the weight of the liquid oil, and
    between 45 and 90 wt. % of a hard fat component with a StOSt/POP ratio of at least 2.

59. The process of claim 58, wherein the hard fat component has a StOSt/POP ratio of at least 2.5.

60. The process of claim 59, wherein the hard fat component has a StOSt/POP ratio of at least 3.0.

* * * * *